United States Patent [19]

Minami

[11] Patent Number: 5,402,446
[45] Date of Patent: Mar. 28, 1995

[54] FSK RECEIVER HAVING A PLL LOCAL OSCILLATOR OPERABLE IN INTERMITTENT OPERATION IN ACCORDANCE WITH ITS PHASE LOCKED STATE

[75] Inventor: Yoichiro Minami, Tokyo, Japan

[73] Assignee: NEC Corporation, Tokyo, Japan

[21] Appl. No.: 119,676

[22] Filed: Sep. 13, 1993

[30] Foreign Application Priority Data

Sep. 17, 1992 [JP] Japan .................................. 4-247003

[51] Int. Cl.$^6$ ...................... H04L 27/14; H04L 27/06
[52] U.S. Cl. .................................. 375/344; 375/327;
375/344; 455/343; 455/260
[58] Field of Search ...................... 455/343, 260, 182.1,
455/182.2, 183.1, 192.1, 192.2, 255, 257, 258,
259, 265, 208; 375/88, 97, 45, 120, 119, 80, 81,
94, 106; 331/1 A, 1 R; 329/300

[56] References Cited

U.S. PATENT DOCUMENTS

| | | | |
|---|---|---|---|
| 4,521,918 | 6/1985 | Challen | 455/343 |
| 4,743,864 | 5/1988 | Nakagawa et al. | 455/343 |
| 4,860,321 | 8/1989 | von der Embse | 375/97 |
| 4,955,075 | 9/1990 | Anderson | 455/343 |
| 4,977,613 | 12/1990 | Holcomb, Sr. et al. | 455/260 |
| 5,031,231 | 6/1991 | Miyazaki | 455/343 |
| 5,103,464 | 4/1992 | Capkun et al. | 375/106 |
| 5,175,884 | 12/1992 | Suarez | 455/260 |

*Primary Examiner*—Stephen Chin
*Assistant Examiner*—Hai H. Phan
*Attorney, Agent, or Firm*—Young & Thompson

[57] ABSTRACT

In an FSK receiver of double superheterodyne type for receiving an FSK modulated wave and comprising a PLL local oscillator (10) for ensuring a phase-locked loop to produce a first local oscillation signal and a demodulating section (12) for demodulating the FSK modulated wave into a demodulated signal using the first local oscillation signal and a second local oscillation signal, a control signal producing circuit (14) produces a control signal when the demodulated signal has a mean value indicative of a deviation from a phase lock in the phase-locked loop. Connected to the demodulating section, a synchronizing circuit (16) establishes bit and frame synchronization on the basis of a binary digital signal obtained by deciding the demodulated signal to produce a synchronization detection signal when the bit and frame synchronization is established. Connected to the PLL local oscillator, the control signal producing circuit, and the synchronizing circuit, an intermittent driving circuit (18) makes the PLL local oscillator intermittently operate on the basis of the control signal and the synchronization detection signal.

4 Claims, 4 Drawing Sheets

T : LEADING TIMING IN PLL ON/OFF SIG & VCO ON/OFF SIG
T0 > T1

FSK RECEIVER HAVING A PLL LOCAL OSCILLATOR OPERABLE IN INTERMITTENT OPERATION IN ACCORDANCE WITH ITS PHASE LOCKED STATE

BACKGROUND OF THE INVENTION

This invention relates to a frequency-shift keying (FSK) receiver and, in particular, to a FSK receiver of double superheterodyne type for demodulating an FSK modulated signal using a local oscillation signal generated by a phase-locked oscillator as a first local oscillation signal.

There are two types in FSK receivers. A first type is an FSK receiver including, as a local oscillator, a phase-locked oscillator having a quartz crystal resonator. Such an FSK receiver can deal with a lot of line or channel frequencies using the quartz crystal resonator. This is because the phase-locked oscillator of the first type oscillates a local oscillation signal having a variable local frequency. A second type is an FSK receiver including, as a local oscillator, a quartz crystal oscillator which oscillates a local oscillation signal having a fixed local frequency.

The FSK receiver may be a radio paging receiver. The radio paging receiver is used in various service areas assigned with the line frequencies, respectively, which are different from each other. It will be assumed that a called person carrying a radio paging receiver transfers from a service area assigned with a line frequency from another service area assigned with another line frequency. In this event, it is impossible to call the called person who carries the radio paging receiver of the second type. On the other hand, it is possible to indisputably call the called person who carries the radio paging receiver of the first type.

In general, the radio paging receiver is activated by a battery. In order to save the battery, the radio paging receiver is operable in an intermittent operation in the manner well known in the art. In spite of battery saving, the radio paging receiver of the first type consumes much current in comparison with that of the second type. This is because the phase-locked oscillator carries out a phase-locked loop (PLL) control. As a result, the radio paging receiver of the first type shortens battery's life.

SUMMARY OF THE INVENTION

It is therefore an object of this invention to provide an FSK receiver which is capable of effectively reducing a consumption current due to a PLL control.

Other objects of this invention will become clear as the description proceeds.

On describing the gist of an aspect of this invention, it is necessary to understand that a frequency-shift keying (FSK) receiver of double superheterodyne type receives an FSK modulated wave having a radio frequency. The FSK modulated wave is obtained by frequency modulating a carrier wave by a baseband signal indicative of a binary digital signal.

According to the aspect of this invention, the above-understood FSK receiver comprises a phase-locked loop (PLL) local oscillator for ensuring that a phase-locked loop for the FSK modulated wave produces a first local oscillation signal necessary for demodulation of the FSK modulated wave. The first local oscillation signal has a first local frequency which is variable. Supplied with the FSK modulated wave and connected to the PLL local oscillator, demodulating means demodulates the FSK modulated wave into a demodulated signal using the first local oscillation signal and a second local oscillation signal having a second local frequency which is fixed. The demodulated signal is a replica of the baseband signal. The demodulating means reproduces the binary digital signal obtained by deciding the demodulated signal. Connected to the demodulating means, control signal producing means produces a control signal when the demodulated signal has a mean value indicative of a deviation from a phase lock in the phase-locked loop. Connected to the demodulating means, synchronizing means establishes bit and frame synchronization on the basis of the demodulated signal to produce a synchronization detection signal when the bit and frame synchronization is established. Connected to the PLL local oscillator, the control signal producing means, and the synchronizing means, intermittent driving means makes the PLL local oscillator intermittently operate on the basis of the control signal and the synchronization detection signal. The PLL intermittent driving means makes the PLL local oscillator stop its PLL operation when the control signal is absent. The PLL intermittent driving means makes the PLL local oscillator activate the PLL operation when the control signal is present.

DESCRIPTION OF THE PREFERRED EMBODIMENT

Figure 1:
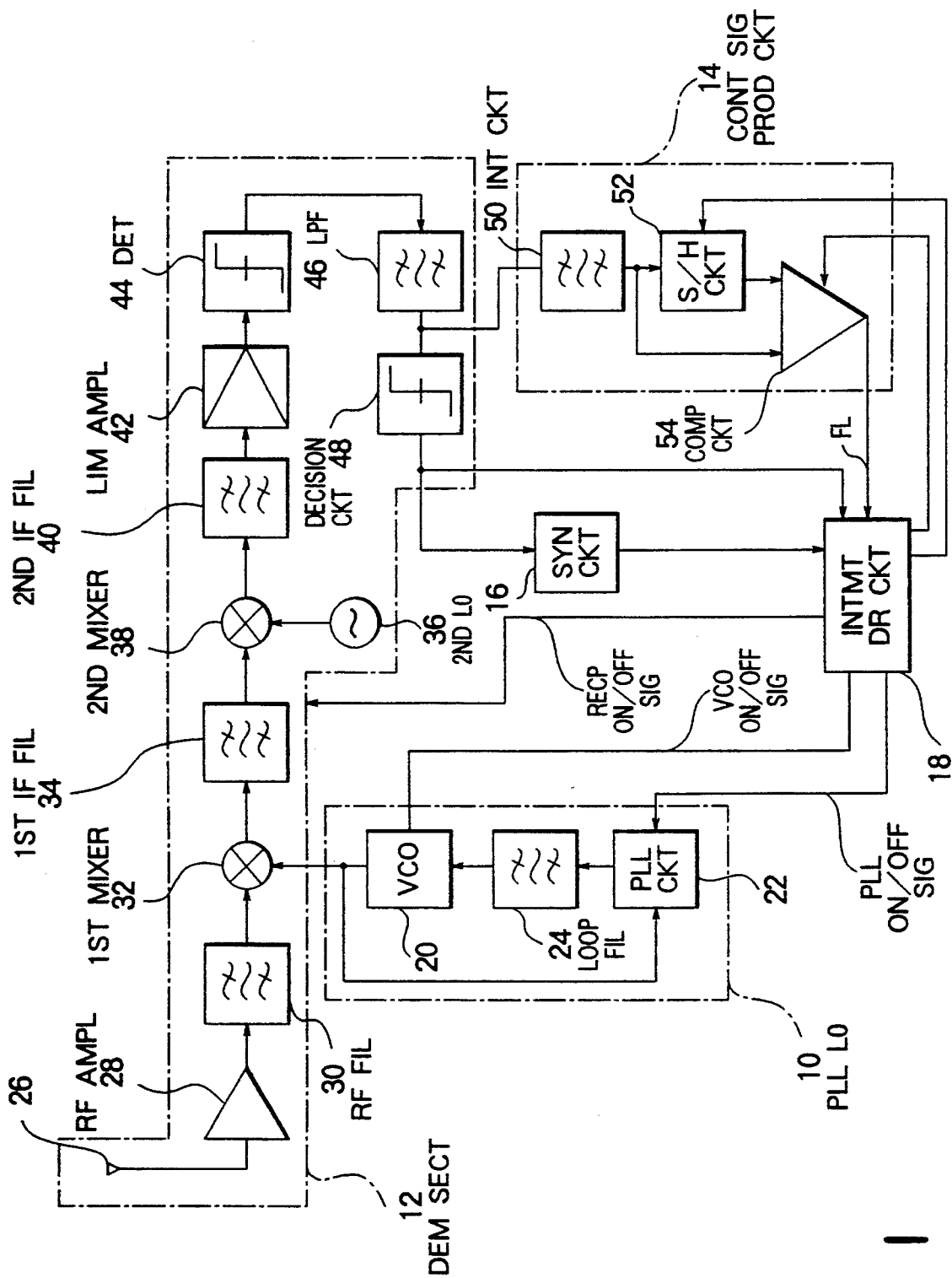
FIG. 1 is a block diagram of a frequency-shift keying (FSK) receiver according to a preferred embodiment of the invention.

Referring to FIG. 1, a frequency-shift keying (FSK) receiver according to a preferred embodiment of the present invention is of double superheterodyne type and receives an FSK modulated wave having a radio frequency. The FSK modulated wave is obtained by frequency modulating a carrier wave by a baseband signal indicative of a binary digital signal.

The FSK receiver is energized by a battery (not shown) and comprises a phase-locked loop (PLL) local oscillator 10, a demodulating section 12, a control signal producing circuit 14, a synchronizing circuit 16, and an intermittent driving circuit 18.

The PLL local oscillator 10 ensures a phase-locked loop for the FSK modulated wave to produce a first local oscillation signal which is necessary for demodulation of the FSK modulated wave. The first local oscillation signal has a first local frequency which is variable. In particular, the PLL local oscillator 10 comprises a voltage controlled oscillator (VCO) 20, a PLL circuit 22, and a loop filter 24.

The voltage controlled oscillator 20 is supplied with a control voltage signal indicative of a control voltage which will later be described. Responsive to the control voltage signal, the voltage controlled oscillator 20 generates a voltage controlled signal as the first local oscillation signal. In the manner which will later become clear, the voltage controlled oscillator 20 is supplied with a VCO on/off signal from the intermittent driving circuit 18. The voltage controlled oscillator 20 is put into an ON state when the VCO on/off signal indicates ON while the voltage controlled oscillator 20 is put into an OFF state when the VCO on/off signal indicates OFF. In other words, the intermittent driving circuit 18 supplies the VCO on/off signal to the voltage controlled oscillator 20 to make the voltage controlled oscillator 20 turn on/off.

The PLL circuit 22 is connected to the voltage controlled oscillator 20. In the manner which will later become clear, the PLL circuit 22 produces a phase difference signal in response to the voltage controlled signal. The PLL circuit 22 is supplied with a PLL on/off signal from the intermittent driving circuit 18 in the manner which will be described as the description proceeds. The PLL circuit 22 is put into an ON state when the PLL on/off signal indicates ON while the PLL circuit 22 is put into an OFF state when the PLL on/off signal indicates OFF. In other words, the intermittent driving circuit 18 supplies the PLL on/off signal to the PLL circuit 22 to make the PLL circuit 22 turn on/off.

The loop filter 24 is connected to the PLL circuit 22 and the voltage controlled oscillator 20. In the manner well known in the art, the loop filter 24 filters the phase difference signal to the control voltage signal which is supplied to the voltage controlled oscillator 20.

The demodulating section 12, which is supplied with the FSK modulated wave, is connected to the PLL local oscillator 10. The demodulating section 12 demodulates the FSK modulated wave into a demodulated signal using the first local oscillation signal and a second local oscillation signal having a second local frequency which is fixed. The demodulated signal is a replica of the baseband signal. The demodulating section 12 reproduces the binary digital signal obtained by deciding the demodulated signal. In particular, the demodulating section 12 comprises an antenna 26, a radio-frequency (RF) amplifier 28, a radio-frequency (RF) filter 30, a first mixer 32, a first intermediate-frequency (IF) filter 34, a second local oscillator 36, a second mixer 38, a second intermediate-frequency (IF) filter 40, a limiter amplifier 42, a detector 44, a low pass filter (LPF) 46, and a decision circuit 48.

The FSK modulated wave is received in the antenna 26 and then is amplified by the RF amplifier 28. The RF amplifier 28 produces an amplified FSK modulated signal which is supplied to the RF filter 30. The RF filter 30 band-pass filters the amplified FSK modulated signal into a band-limited FSK modulated signal which is supplied to the first mixer 32. The first mixer 32 is supplied with the first local oscillation signal from the voltage controlled oscillator 20. The first mixer 32 mixes the band-limited FSK modulated signal with the first local oscillation signal to produce a first mixed signal which is supplied to the first IF filter 34. The first IF filter 34 band-pass filters the first mixed signal into a first intermediate-frequency (IF) signal having a first intermediate frequency. That is, a combination of the antenna 26, the RF amplifier 28, the RF filter 30, the first mixer 32, and the first IF filter 34 serves as a first frequency converting arrangement for frequency converting the FSK modulated wave into the first intermediate frequency signal having the first intermediate frequency on the basis of the first local oscillation signal. The first intermediate frequency is equal to a difference between the radio frequency and the first local frequency.

The second local oscillator 36 oscillates the second local oscillation signal having the second local frequency. The second local oscillation signal is supplied to the second mixer 38 which is supplied with the first IF signal from the first IF filter 34. The second mixer 38 mixes the first IF signal with the second local oscillation signal to produce a second mixed signal which is supplied to the second IF filter 40. The second IF filter 40 band-pass filters the second mixed signal into a second intermediate-frequency (IF) signal having a second intermediate frequency. That is, a combination of the second mixer 38 and the second IF filter 40 acts as a second frequency converting arrangement for frequency converting the first IF signal into the second IF signal having the second intermediate frequency on the basis of the second local oscillation signal. The second intermediate frequency is equal to a difference between the first intermediate frequency and the second local frequency.

The second IF filter 40 is connected to the limiter amplifier 42. The limiter amplifier 42 removes an amplitude modulation (AM) component from the second IF signal to produce a limited signal which is supplied to the detector 44. The detector 44 carries out a detection operation on the limited signal to produce a detected signal which is supplied to the low pass filter 46. The low pass filter 46 low-pass filters the detected signal into a low-passed signal as the demodulated signal. That is, a combination of the limiter amplifier 42, the detector 44, and the low pass filter 46 is operable as a detecting arrangement for detecting the demodulated signal in the second IF signal. The low pass filter 46 is connected to the decision circuit 48. The decision circuit 48 carries out a decision operation on the demodulated signal to reproduce the binary digital signal.

The control signal producing circuit 14 is connected to the demodulating section 12. The control signal producing circuit 14 produces a control signal FL when the demodulated signal has a mean value indicative of a deviation from a phase lock in the phase-locked loop. The control signal producing circuit 14 comprises an integrating circuit 50, a sample and hold (S/H) circuit 52, and a comparing circuit 54. The integrating circuit 50 is connected to the demodulating section 12. The integrating circuit 50 integrates the demodulated signal to produce an integrated signal indicative of a d.c. voltage. The integrating circuit 50 is connected to the S/H circuit 52. The S/H circuit 52 is supplied with a sampling timing signal from the intermittent driving circuit 18. Responsive to the sampling timing signal, the S/H circuit 52 samples and holds the integrated signal as a held signal indicative of the mean value. The S/H circuit 52 is connected to the comparing circuit 54 which is connected to the integrating circuit 50. The comparing circuit 54 compares the held signal with the integrated signal. The comparing circuit 54 produces the control signal FL when a difference between the d.c. voltage and the mean value exceeds a predetermined value.

The synchronizing circuit 16 is connected to the demodulating section 12. The synchronizing circuit 16 establishes bit and frame synchronization on the basis of the binary digital signal to produce a synchronization detection signal when the bit and frame synchronization is established.

The intermittent driving circuit 18 is connected to the PLL local oscillator 10, the demodulating section 12, the control signal producing circuit 14, the synchronizing circuit 16. The intermittent driving circuit 18 makes the PLL local oscillator 10 intermittently operate on the basis of the control signal and the synchronization detection signal in the manner which will later become clear. That is, the PLL intermittent driving circuit 18 makes the PLL local oscillator 10 stop its PLL operation when the control signal is absent. The PLL intermittent driving circuit 18 makes the PLL local oscillator 10 activate the PLL operation when the control signal is present. In the manner well known in the art, the PLL intermittent driving circuit 18 supplies a reception on/off signal to the demodulating section 12 to control the demodulating section 12 so as to turn on/off the demodulating section 12.

Figure 2:
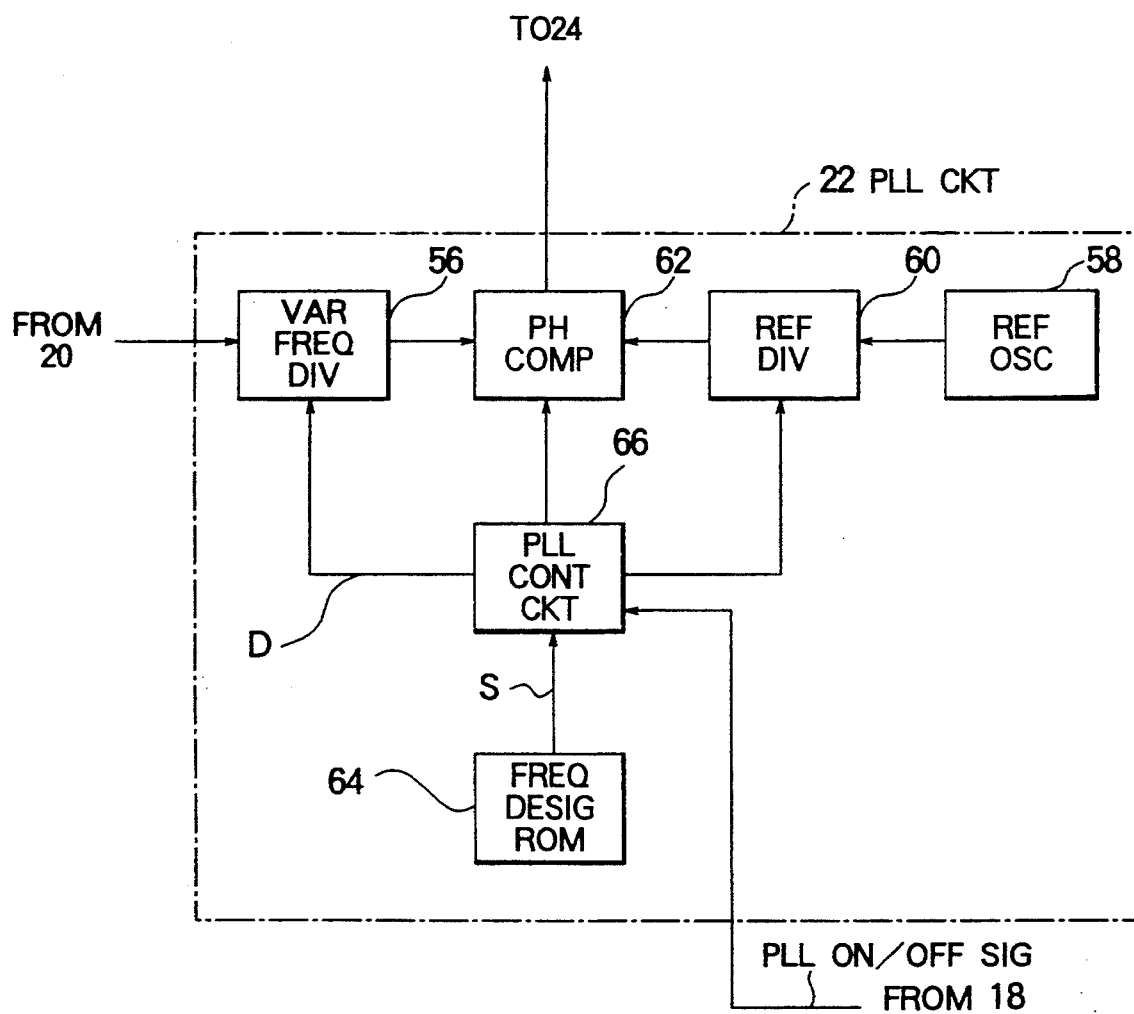
FIG. 2 is a block diagram of a phase-locked loop (PLL) circuit used in the FSK receiver illustrated in FIG. 1.

Turning to FIG. 2, the PLL circuit 22 comprises a variable frequency divider 56, a reference oscillator 58, a reference frequency divider 60, a phase comparator 62, a frequency designation read only memory (ROM) 64, and a PLL control circuit 66.

The variable frequency divider 56 is supplied with a designated dividing number D from the PLL control circuit 66 and is connected to the voltage controlled oscillator 20. The variable frequency divider 56 frequency divides the voltage controlled signal on the basis of the designated dividing number D to produce a first divided signal.

The reference oscillator 58 oscillates a reference signal with a reference frequency. The reference oscillator 58 is connected to the reference frequency divider 60 which is supplied with a reference dividing number from the PLL control circuit 66. The reference frequency divider 60 frequency divides the reference signal on the basis of the reference dividing number to produce a second divided signal.

The phase comparator 62 is connected to the variable frequency divider 56, the reference frequency divider 60, and the loop filter 24 (FIG. 1). The phase comparator 62 detects a phase difference between the first and the second divided signals to produce a phase difference signal indicative of the phase difference. The phase difference signal is supplied to the loop filter 24.

The frequency designation ROM 64 stores a plurality of frequency designation signals indicative of local frequencies. The PLL control circuit 66 is connected to the intermittent driving circuit 18 (FIG. 1), the variable frequency divider 56, the reference frequency divider 60, the phase comparator 62, and the frequency designation ROM 64. The PLL control circuit 66 accesses the frequency designation ROM 64 to read a particular one of the frequency designation signals. The PLL control circuit 66 supplies the particular frequency designation signal S as the designated dividing number D to the variable frequency divider 56. Responsive to the PLL on/off signal indicative of OFF, the PLL control circuit 66 puts the phase comparator 62 into a high impedance state.

It is assumed that the reference frequency is equal to 10 kHz and the frequency designation signal S is represented by fifteen bits. In this event, the PLL circuit 22 has a maximum setting frequency MSF which is represented by:

$$MSF = (2^{15} - 1) \times 10 \ kHz = 327.67 \ MHz.$$

Figure 3:
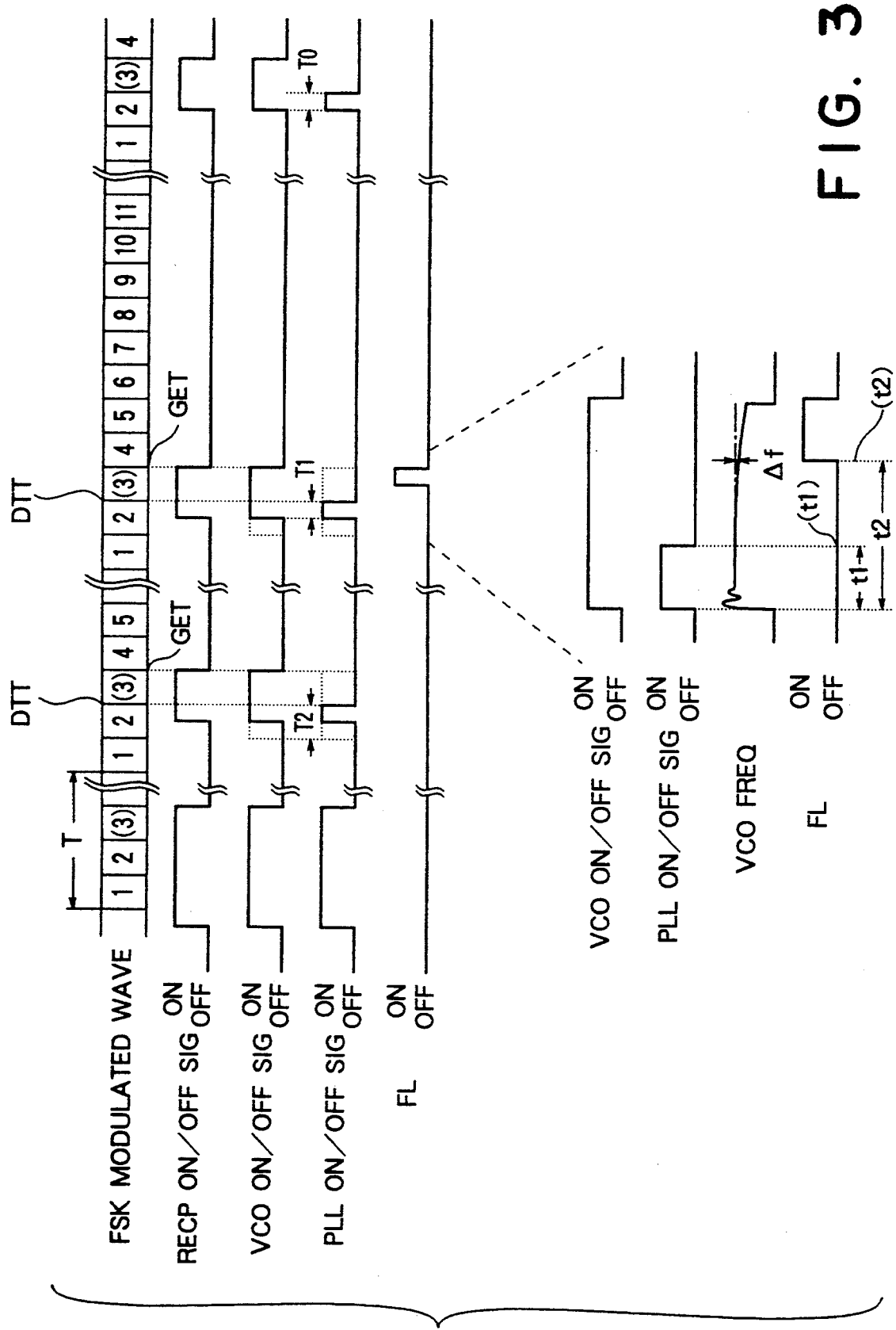
FIG. 3 is a time chart for use in describing operation of the FSK receiver illustrated in FIG. 1.

Referring to FIG. 3 in addition to FIG. 1 and FIG. 2, description will be made as regards operation of the FSK receiver illustrated in FIG. 1. The FSK modulated wave has a frame structure where each frame has a frame period depicted at T and consists of first through N-th time slots which are indicated along a top or first line in FIG. 3 by numerals 1, 2, 3, and so on, where N represents a predetermined number. The first through the N-th time slots correspond to first through N-th groups to either one of which the FSK receiver belongs. It is assumed that the FSK receiver belongs to a third group which is indicated by a numeral 3 enclosed with parentheses.

The intermittent driving circuit 18 initially produces the reception on/off signal, the VCO on/off signal, and the PLL on/off signal all of which indicate ON as depicted along second through fourth lines. When the FSK receiver receives the third time slot in the PSK modulated wave, the intermittent driving circuit 18 produces the reception on/off signal, the VCO on/off signal, and the PLL on/off signal all of which indicate OFF at a group end timing GET in the third time slot.

Attention will be directed to sixth through ninth lines in FIG. 3. When both of the VCO on/off signal and the PLL on/off signal indicate ON as indicated in the sixth and the seventh lines, the PLL local oscillator 10 starts its oscillation operation. The intermittent driving circuit 18 produces the PLL on/off signal indicative of OFF at a first time (t1) after a lapse of a first time interval t1 from a timing where the voltage controlled oscillator 20 starts its oscillation operation. The time interval t1 is preliminarily set in as a time interval sufficient so that the voltage controlled oscillator 20 is put into a normal oscillation state.

At time (t1), the intermittent driving circuit 18 delivers the sampling timing signal to the S/H circuit 52 to make the S/H circuit 52 hold, as the held signal, the integrated signal having a d.c. voltage corresponding to the first local frequency of the voltage controlled oscillator 20. The held signal is supplied to the comparing circuit 54 as a reference voltage. At time (t2) after a lapse of a second time interval t2 from the time where the voltage controlled oscillator 20 starts its oscillation operation, the comparing circuit 54 compares the reference voltage with the d.c. voltage indicated by the integrated signal produced by the integrating circuit 50. When the difference between the reference voltage with the d.c. voltage exceeds the predetermined value, the comparing circuit 54 produces the control signal FL as indicated in the ninth line in FIG. 3. The predetermined value is preliminarily set in as a level indicative of a frequency error Δf indicating that the voltage controlled oscillator 20 has deviated from the phase lock in the phase-locked loop.

Figure 4:
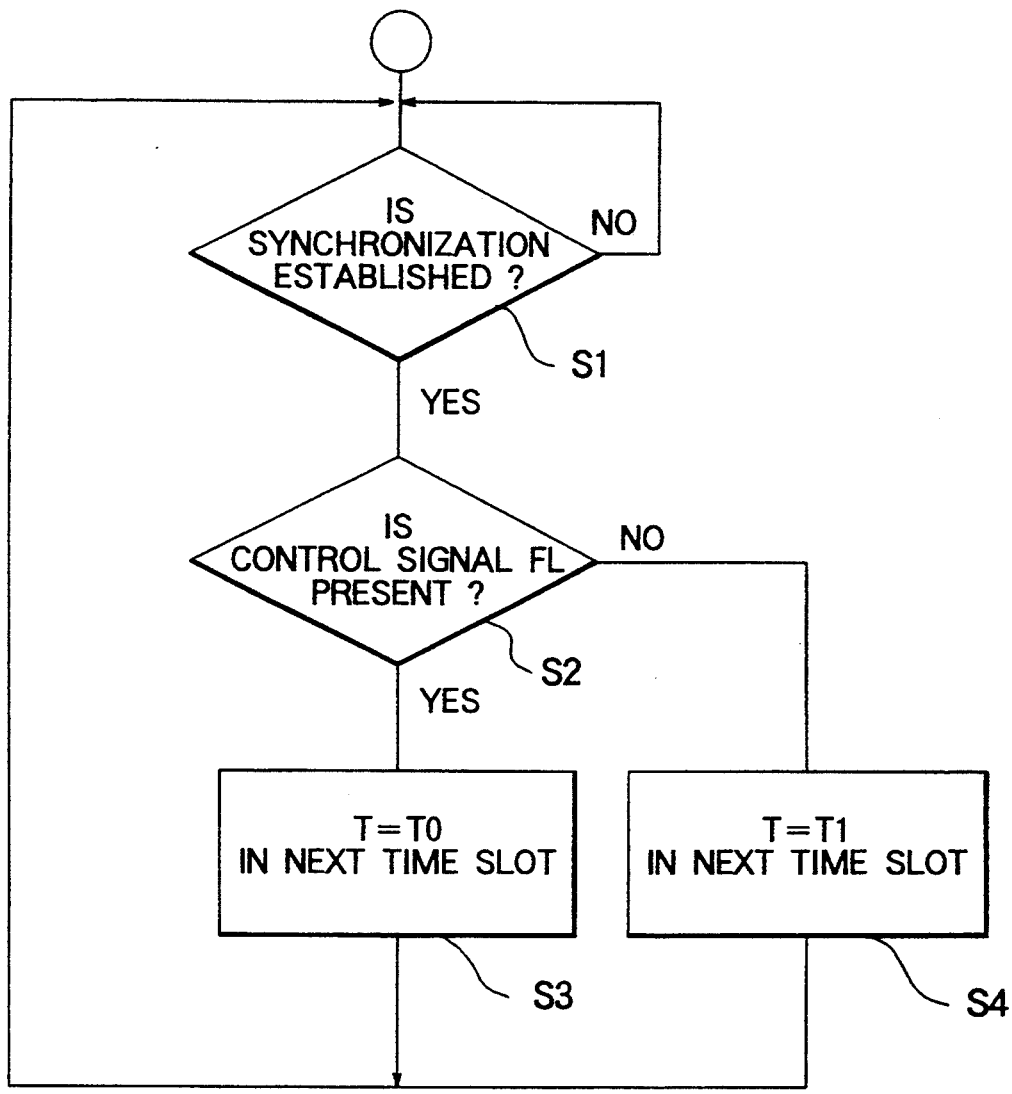
FIG. 4 is a flow chart for use in describing operation of an intermittent driving circuit used in the FSK receiver illustrated in FIG. 1.

Referring to FIG. 4 in addition to FIG. 3, description will be made as regards operation of the intermittent driving circuit 18.

In prior art, a conventional intermittent driving circuit produces the VCO on/off signal and the PLL on/off signal, both of which indicate ON at a leading time earlier than a data taking-in time in the third time slot by a time interval T2 while allowing for a margin of a phase lock pull-in time in the PLL local oscillator as indicated at a dotted line in FIG. 3. And the conventional intermittent driving circuit produces the VCO on/off signal and the PLL on/off signal both of which indicate OFF at the group end time in the third time slot as indicated at the dotted line in FIG. 3.

The present inventor directs his attention to the phase lock pull-in time in the PLL local oscillator 10. In general, the phase lock pull-in time becomes shorter when the voltage controlled oscillator 20 has a little frequency error in its free running state. In particular, the phase lock pull-in time becomes shorter when the phase lock is established. This is because the voltage controlled oscillator 20 has a little frequency error. The intermittent driving circuit 18 produces the VCO on/off signal and the PLL on/off signal both of which indicate ON at a leading time earlier than the data taking-in time in the third time slot by a time interval T1 which is remarkably shorter than the time interval T2 indicated by a solid line in FIG. 3. The intermittent driving circuit 18 produces the PLL on/off signal indicative of OFF at the data taking-in time in the third time slot as indicated by the solid line in FIG. 3 thereby free running the voltage controlled oscillator 20 until the group end time in the third time slot.

Under the circumstances, the phase comparator 62 is put into the high impedance state to hold the phase difference signal to be sent to the loop filter 24. Due to such an intermittent control of the PLL operation, it is possible to reduce an operation current in the FSK receiver on reception.

Description will proceed to a case where the control voltage is reduced due to a leakage current, disturbance, or the like whereby the first local frequency in the voltage controlled oscillator 20 varies. It is assumed that the first local frequency in the voltage controlled oscillator 20 varies by the frequency error $\Delta f$ during reception of the FSK modulated wave in the FSK receiver. In this event, the control signal producing circuit 14 produces the control signal FL at time (t2) as indicated at the ninth line in FIG. 3.

Turning to FIG. 4 in addition to FIG. 3, the intermittent driving circuit 18 determines whether or not the bit and frame synchronization is established on the basis of the synchronization detection signal supplied from the synchronizing circuit 16 at a step S1 in FIG. 4. When the bit and frame synchronization is established, the step S1 is followed by a step S2 at which the intermittent driving circuit 18 determines whether the control signal FL is present or absent. When the control signal FL is present, the step S2 is succeeded by a step S3 at which the intermittent driving circuit 18 produces the PLL on/off signal and the VCO on/off signal both of which indicate ON at a leading time earlier than the data taking-in time in a next time slot (the third time slot) by a time interval T0 which is longer than the time interval T1. As a result, the PLL local oscillator 10 can certainly carry out the phase lock pull-in operation. When the control signal FL is absent, the step S2 is succeeded by a step S4 at which the intermittent driving circuit 18 produces the PLL on/off signal and the VCO on/off signal both of which indicate ON at a leading time earlier than the data taking-in time in the next own time slot by the time interval T1.

As mentioned before, the FSK receiver comprises the intermittent driving circuit 18 for intermittently driving the PLL circuit 22 in accordance with the phase lock pull-in state in the PLL local oscillator 10. Accordingly, it is possible to reduce a consumption current in the PLL circuit 22 on reception of the FSK receiver. As a result, it is possible to extremely lengthen the life of the battery.

While this invention has been described in conjunction with a preferred embodiment thereof, it will now be readily possible for those skilled in the art to put this invention into practice in various other manners.

What is claimed is:

1. A frequency-shift keying (FSK) receiver of double superheterodyne type for receiving an FSK modulated wave having a radio frequency, said FSK modulated wave being obtained by frequency modulating a carrier wave by a baseband signal indicative of a binary digital signal, said FSK receiver comprising:

a phase-locked loop (PLL) local oscillator for ensuring a phase-locked loop for said FSK modulated wave to produce a first local oscillation signal which is necessary for demodulation of said FSK modulated wave, said first local oscillation signal having a first local frequency which is variable;

said PLL local oscillator comprising a voltage controlled oscillator (VCO) supplied with a control voltage signal for generating a voltage controlled signal as said first local oscillation signal, a PLL circuit connected to said voltage controlled oscillator for producing a phase difference signal in response to said voltage controlled signal, and a loop filter connected to said PLL circuit and said voltage controlled oscillator for filtering said phase difference signal to said control voltage signal;

demodulating means supplied with said FSK modulated wave and connected to said PLL local oscillator for demodulating said FSK modulated wave into a demodulated signal using said first local oscillation signal and a second local oscillation signal having a second local frequency which is fixed, said demodulated signal being a replica of said baseband signal, said demodulating means reproducing said binary digital signal obtained by deciding said demodulated signal;

control signal producing means connected to said demodulating means for producing a control signal when said demodulated signal has a mean value indicative of a deviation from a phase lock in said phase-locked loop;

synchronizing means connected to said demodulating means for establishing bit and frame synchronization according to said binary digital signal to produce a synchronization detection signal when said bit and frame synchronization is established; and intermittent driving means connected to said PLL local oscillator, said control signal producing means, and said synchronizing means for making said PLL local oscillator intermittently operate according to said control signal and said synchronization detection signal, said intermittent driving means making said PLL local oscillator to stop its PLL operation when said control signal is absent, said intermittent driving means making said PLL local oscillator to activate said PLL operation when said control signal is present, said intermittent driving means supplying a VCO on/off signal to said voltage controlled oscillator to make said voltage controlled oscillator turn on/off, said intermittent driving means supplying a PLL on/off signal to said PLL circuit to make said PLL circuit turn on/off, said PLL on/off signal indicating ON for a time interval sufficient so that said voltage controlled oscillator is put into a normal oscillation state, said VCO on/off signal indicating ON for a time duration which is longer than said time interval, whereby said voltage controlled oscillator free runs although said PLL circuit is turned off.

2. An FSK receiver as claimed in claim 1, wherein said demodulating means comprises:

first frequency converting means supplied with said FSK modulated wave and connected to said PLL local oscillator for frequency converting said FSK modulated wave into a first intermediate frequency signal having a first intermediate frequency on the basis of said first local oscillation signal, said first intermediate frequency being equal to a difference between said radio frequency and said first local frequency;

a second local oscillator for oscillating said second local oscillation signal;

second frequency converting means connected to said first frequency converting means and said second local oscillator for frequency converting said first intermediate frequency signal into a second intermediate frequency signal having a second intermediate frequency on the basis of said second local oscillation signal, said second intermediate frequency being equal to a difference between said first intermediate frequency and said second local frequency;

detecting means connected to said second frequency converting means for detecting said demodulated signal in said second intermediate frequency signal; and decision means connected to said detecting means for carrying out a decision operation on said demodulated signal to produce said binary digital signal.

3. An FSK receiver as claimed in claim 1, wherein said control signal producing means comprises:

integrating means connected to said demodulating means for integrating said demodulated signal to produce an integrated signal indicative of a d.c. voltage;

sample and hold means connected to said integrating means for sampling and holding said integrated signal as a held signal indicative of said mean value; and comparing means connected to said integrating means and said sample and hold means for comparing said held signal with said integrated signal, said comparing means producing said control signal when a difference between said d.c. voltage and said mean value exceeds a predetermined value.

4. An FSK receiver as claimed in claim 1, wherein said PLL circuit comprises:

a variable frequency divider supplied with a designated dividing number and connected to said voltage controlled oscillator for frequency dividing said voltage controlled signal on the basis of said designated dividing number to produce a first divided signal;

a reference oscillator for oscillating a reference signal with a reference frequency;

a reference frequency divider supplied with a reference dividing number and connected to said reference oscillator for frequency dividing said reference signal on the basis of said reference dividing number to produce a second divided signal;

a phase comparator connected to said variable frequency divider, said reference frequency divider, and said loop filter for detecting a phase difference between said first and said second divided signal to produce said phase difference signal indicative of said phase difference;

a frequency designation memory for storing a plurality of frequency designation signals indicative of local frequencies; and a PLL control circuit connected to said intermittent driving means, said variable frequency divider, said phase comparator, and said frequency designation memory for accessing said frequency designation memory to read one of said frequency designation signals, said PLL control circuit supplying said one of the frequency designation signals as said designated dividing number to said variable frequency divider, said PLL control circuit putting said phase comparator into a high impedance state when said PLL on/off signal indicates OFF.

* * * * *